United States Patent
Oehler

(10) Patent No.: US 8,570,217 B2
(45) Date of Patent: Oct. 29, 2013

(54) METHOD OF AMENDING NAVIGATION DATA OF A GLOBAL NAVIGATION SYSTEM

(75) Inventor: Veit Oehler, Neubiberg (DE)

(73) Assignee: Astrium GmbH, Taufkirchen (DE)

( * ) Notice: Subject to any disclaimer, the term of this patent is extended or adjusted under 35 U.S.C. 154(b) by 500 days.

(21) Appl. No.: 12/763,855

(22) Filed: Apr. 20, 2010

(65) Prior Publication Data

US 2010/0265132 A1    Oct. 21, 2010

(30) Foreign Application Priority Data

Apr. 20, 2009    (EP) ................................ 09005512

(51) Int. Cl.
*G01S 19/20* (2010.01)
*G01S 19/38* (2010.01)

(52) U.S. Cl.
USPC ............................. 342/357.58; 342/357.21

(58) Field of Classification Search
USPC ............ 342/357.21, 357.25, 357.45, 357.58; 701/468, 476
See application file for complete search history.

(56) References Cited

U.S. PATENT DOCUMENTS

| 5,808,581 A | 9/1998 | Braisted et al. |
|---|---|---|
| 8,094,069 B2 | 1/2012 | Rang et al. |
| 2007/0241958 A1 | 10/2007 | Nicholson et al. |

FOREIGN PATENT DOCUMENTS

| DE | 10 2007 006 612 A1 | 8/2008 |
|---|---|---|
| WO | WO 2006/032422 A1 | 3/2006 |

OTHER PUBLICATIONS

European Search Report dated Oct. 28, 2009 (six (6) pages).

Veit Oehler et al., "The Galileo Integrity Concept", ION GNSS 17th International Technical Meeting of the Satellite Division, Sep. 2004, pp. 604-615, XP002375520.

W. Y. Ochieng et al., "Integrity Performance Models for a Combined Galileo/GPS Navigation", Journal of Geospatial Engineering, vol. 3, No. 1, 2001, pp. 21-32, XP002550138.

Pierre Waller et al., "In-Orbit Performance Assessment of Giove Clocks", PTTI Conference, 2008, (twelve (12) pages) XP002549448.

P. Rochat et al., "The Onboard Galileo Rubidium and Passive Maser, Status & Performance", Frequency Control Symposium and Exposition, 2005, IEEE, pp. 26-32, XP010877136.

Boris Pervan et al., "Sigma Estimation, Inflation, and Monitoring in the LAAS Ground System", ION GPS, 2000, pp. 1234-1244, XP007910157.

Wolfgang Werner, et al. "GALILEO Integrity Performance Assessment Results and Recommendations," ION GPS 2002, Sep. 24-27, 2002, Portland, OR, pp. 2185-2195.

Hans L. Trautenberg, "How Many Satellites are Necessary to Provide APV Everywhere?," ION GNSS 20th International Technical Meeting of the Satellite Division, Sep. 25-28, 2007, Fort Worth, TX, pp. 3064-3069.

European Search Report in related application No. 12007983.5-2220 dated Feb. 4, 2013.

*Primary Examiner* — Dao Phan

(74) *Attorney, Agent, or Firm* — Crowell & Moring LLP

(57) ABSTRACT

In a method for reducing the adverse effect of clock frequency jumps on a user-position determination device in a global navigation system, a plurality of space vehicles each having a clock, transmit position determination information to the position determining device. If a sufficient number of such navigation signals from a first group of space vehicles having clocks in which no jump occurs are available for this purpose, and if a calculated integrity risk is acceptable, position determination is performed using those navigation signals. If not, however, the position determination device receives navigation signals from space vehicles of a second group with clocks in which jumps can occur. The latter signals are combined with signals from the first group in a manner which takes into account possible jumps, and the process is repeated.

9 Claims, 4 Drawing Sheets

METHOD OF AMENDING NAVIGATION DATA OF A GLOBAL NAVIGATION SYSTEM

BACKGROUND AND SUMMARY OF THE INVENTION

This application claims the priority of European patent document EP 09 005 512.0, filed Apr. 20, 2009, the disclosure of which is expressly incorporated by reference herein.

The present invention is directed to a method of amending navigation data of a global navigation system that comprises a plurality of space vehicles which transmit information to a device for position detection, with each space vehicle having at least one clock. In particular, the method according to the invention reduces the impact of jumps in the space vehicle clock frequency on the position detection device.

Space vehicle based navigation systems, such as satellite navigation systems, generally rely on very stable satellite clock performance to allow accurate satellite clock behavior prediction, which is required to model accurately the satellite clocks at the user level. The user predicts the clock behavior via related transmitted clock parameters, which are estimated on ground, based on measurements over long intervals (e.g., one to two days). International Patent Document WO 2006/032422 A1 discloses a method and apparatus for providing integrity information for users of a global navigation system. The disclosure of this document is fully incorporated by reference herein.

Unpredictable events, which cannot be modeled, and thus cannot be compensated or predicted at user level, directly degrade achievable ranging accuracy, since such events would cause additional range errors to occur. Early test results, including factory tests of the European Galileo satellites, showed that Rubidium clocks, which are used in the Galileo test satellites (GIOVE-A and GIOVE-B) and which will be used during the In Orbit Validation (IOV) and in the Full Operational Constellation (FOC) of Galileo, are subject to unpredictable frequency jumps, typically one to two events per month. Such jumps affect the ranging accuracy by approximately 1 m to 10 m, and thus have a major impact on all Galileo services.

For typical positioning services like the Open Service (OS) this effect is less critical, since not all users are always affected and jumps also only occur from time to time. Therefore the effect can be compensated or at least mitigated by averaging over Galileo's system lifetime (i.e., 20 years); however, it will degrade the Open Service performance.

For integrity users like Safety-of-Life (SOL) and Public Regulated Service (PRS) users, such averaged compensation is not possible, since a certain accuracy of the individual ranging signal must be ensured with very high confidence. Thus, all integrity information for each satellite and for all of the time, would need to be a-priori degraded in order to take into account the non-predictable events, which would of course jeopardize the related major Galileo services in terms of their availability.

If the unpredictable events like satellite clock frequency jumps were detected on ground, and if warnings could be broadcast to all users accordingly, the integrity services availability degradation could be significantly compensated or reduced, respectively. Unfortunately, however, since such events typically affect the ranging signals below the ground integrity detection barrier thresholds (around 5 m vs. typical range errors around 2 m), most satellite clock frequency jumps cannot be detected on the ground, and therefore the integrity information would need to be a-priori increased accordingly, with significant integrity service availability degradation.

Therefore, it is an object of the present invention to provide a method of amending navigation data in a global navigation system that includes a plurality of space vehicles that transmit information to a device for position detection, each space vehicle comprising at least one clock, wherein the impact of space vehicle clock frequency jumps on the device for position detection is reduced significantly.

This and other objects are achieved by the method according to the invention, in which the impact of space vehicle clock frequency jumps on the device for position detection is reduced by the steps of:

1a) receiving navigation signals from space vehicles of a first group of space vehicles that have clocks in which no frequency jumps occur;

1b) checking
  1b1) whether navigation signals received from a sufficient number of space vehicles of said first group of space vehicles are available for calculating a navigation solution; and
  1b2) whether the integrity risk calculated with the navigation signals received from the space vehicles of said first group of space vehicles is less than or equal to a predetermined acceptable maximum integrity risk;

1c) continuing with calculating a navigation solution or with a critical operation if the conditions of steps 1b1) and 1b2) are fulfilled, or otherwise, continuing with step 1d);

1d) receiving navigation signals from space vehicles of a second group of space vehicles having clocks in which frequency jumps can occur;

1e) adding said navigation signals received from a space vehicle of said second group of space vehicles to said navigation signals received from the space vehicles of said first group of space vehicles, with integrity and in a safe manner;

1f) checking whether the integrity risk calculated for all combinations of the navigation signals received from the space vehicles of said first group, together with the subset of said second group of space vehicles with data integrity, is less than or equal to a predetermined acceptable maximum integrity risk;

1g) continuing with calculating the navigation solution or a critical operation if the condition of step 1f) is fulfilled; or otherwise, adding navigation signals received from another space vehicle of said second group to the navigation signals used in step 1f), with integrity and in a safe manner, and continuing again with step 1f).

Consequently, the respective integrity risks calculated for all combinations of the navigation signals received from the space vehicles of said first and second groups of space vehicles must be lower than the predetermined allocated integrity risk, because it is unknown whether one of the signals received from said second group of space vehicles (and if so, which one) was just affected by a frequency jump or will be affected by it in the near future. Only such a procedure considering all combinations will deliver a result that has integrity (i.e., it is reliable).

The core idea of the first inventive solution is thus to consider primarily signals from satellite clock sources that do not jump. The effect of satellite clock frequency jumps and other similar events (if they cannot be avoided at satellite level, or detected at ground segment level with removal at user level through transmitted alerts) is thus reduced by avoiding the use of affected satellites at user level. This can be realized through suitable user systemic modifications.

The invention thus limits the impact on the projects Galileo In Orbit Validation (IOV) and the Full Operational Constellation (FOC) to a minimum, since neither space segment design changes nor ground segment modifications are required (which typically significantly impact cost and schedule). Only additional analyses and concept modifications at system level are required, together with the relevant test user updates, which do not affect the related mentioned projects significantly.

The basic idea of the invention is thus to overcome, at user algorithm level, the problem that small errors (on the order of a few meters) which are caused by satellite clock frequency jumps for example, can neither be avoided at satellite level, nor be detected by the Galileo ground integrity monitoring concept. This is done by related user integrity process modifications that endeavor to avoid to a maximum extent the usage of potentially affected signals, or to consider only such signals as would have acceptable impact at user level from integrity service availability point of view.

Such modified user algorithms do not require significant system, space or ground segment design changes, since only the final user algorithm implementation is affected. Furthermore, minor data dissemination adjustments (i.e., updates of the signal-in-space interface control document [SIS-ICD]) could also be considered to further improve the process modification compensation. Thus, the invention requires almost no modifications for the IOV/CDE1 and FOC projects in order to compensate for the most critical frequency jump behavior.

Preferably, the navigation signals received from a space vehicle of said second group are added to the navigation signals, with integrity and in a safe manner, by putting them to the ground segment detection threshold in step 1e). The ground detection threshold represents the smallest error, (i.e., jump) for said second group of space vehicles, that the ground integrity monitoring function is able to detect (and to send a warning to the user immediately). "Putting the navigation signal to the threshold" means to consider the signal and the related integrity information as having been fully affected by a jump or other error source up to the detection threshold; this technique ensures the signal is considered in a manner which preserves its integrity, since it is assumed that a jump occurred with a maximum possible error that is just smaller than can be detected by the ground segment.

Alternatively, the navigation signals received from a space vehicle of the second group can be added to the navigation signals, in a safe manner which preserves the signal integrity, by inflating the integrity information of the signal in space accuracy (SISA) in step 1e) to ensure overbounding, with integrity, of the real signal in space error of said signal by the used inflated SISA information. Inflating the integrity information of the signal means that SISA is inflated in such a way that such integrity information still properly (i.e., with integrity) overbounds the real error, even if the signal has just jumped. The inflation must be done in such a way that even the worst possible jump magnitude (i.e., maximum error) is covered. The latter alternative approach could be considered if the SISA inflation provides better integrity service availability compared to the above described conservative detection threshold approach, and vice-versa.

In a further embodiment of the method according to the invention, the SISA is inflated as a function of navigation data age in order to reduce the required integrity information inflation of said signal. That is, the effect of the jump and the related imposed error increases with the age of the latest received satellite clock parameters that are used to model the satellite clock behavior. Right after a jump the "old" parameter still fit the new clock behavior (after the jump); only after some time does the real clock drift away from the estimated (modeled) clock behavior, and the imposed error increases accordingly. If only signals with "young" navigation data (which carry also the clock parameters) are considered, the SISA does not need to be inflated to cover the worst possible maximum error, but only to cover the maximum error that could occur according to the navigation data age.

Further preferably, the space vehicles of said first group of space vehicles are provided with clocks working according to the principle of passive hydrogen maser (PHM). These PHM clocks are known as not having frequency jumps.

According to a second aspect of the invention, the impact of space vehicle clock frequency jumps on the position detection device is reduced by the steps of:

a) receiving navigation signals from all available space vehicles;
b) determining the integrity risk of the navigation signals received from the space vehicles in step a);
c) sorting the received navigation signals for the smallest individual integrity risk in a sorting list;
d) determining a first combination of navigation signals from a predetermined number of space vehicles with the smallest individual integrity risks;
e) checking whether the overall integrity risk calculated with the navigation signals received from the space vehicles of the first combination of space vehicles is equal to or lower than a predetermined acceptable maximum risk;
f) for a sufficient number of available signals, or for the first iteration cycle, considering with integrity the navigation signals from the combination of space vehicles, and calculating the navigation solution or the critical operation, respectively if the condition of step e) for all possible safe combinations is fulfilled; or otherwise, adding to the subset used in step e), in a manner that is safe and preserves signal integrity, navigation signals received from the next space vehicle of the sorting list, and continuing again with step f).

The core idea of this second aspect of the invention is to consider only combinations of measurements that would allow for service usage, even in safe consideration of jumping signals.

Preferably, the navigation signals received from each of the space vehicles of the combination are added to the navigation signals, with integrity and in a safe manner, by putting them to the ground segment detection threshold in step f).

Alternatively the navigation signals received from each of the space vehicles of the combination may be added to the navigation signals, with integrity and in a safe manner, by inflating the integrity information of the signal in space accuracy (SISA) in step f) to ensure the integrity of overbounding of the real signal in space error of said signal by the used inflated SISA information.

Further preferably, the SISA is inflated as a function of navigation data age in order to reduce the required integrity information inflation of said signal.

Other objects, advantages and novel features of the present invention will become apparent from the following detailed description of the invention when considered in conjunction with the accompanying drawings.

DETAILED DESCRIPTION OF PREFERRED EMBODIMENTS

In the following description, the invention is explained as applied to Galileo, which will be an independent global European controlled satellite-based navigation system.

Figure 1:
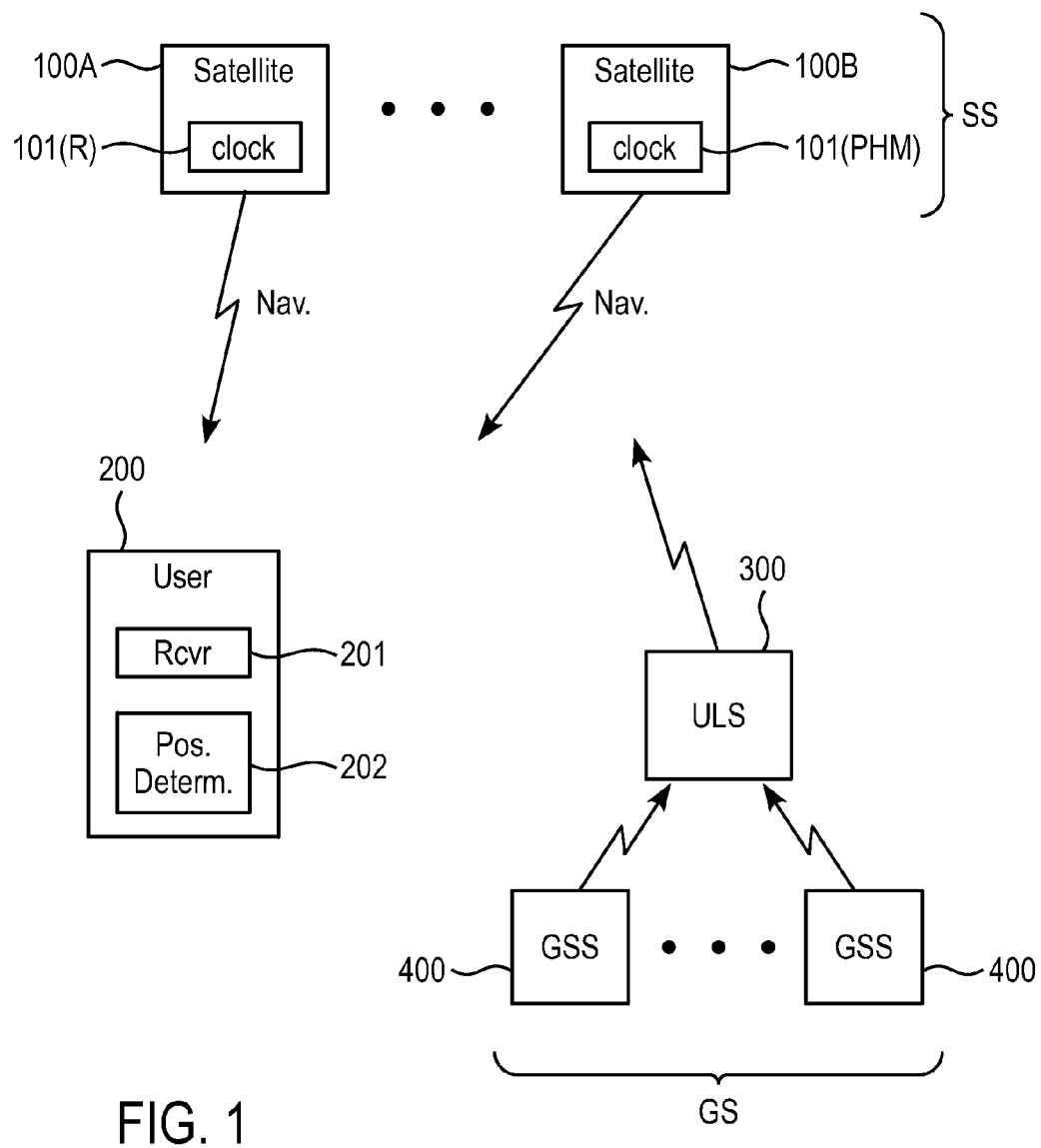
FIG. 1 is a schematic block diagram of global navigation system for implementing the method according to the invention.

As shown in FIG. 1, the Galileo Global Component will comprise space segment SS having a constellation of satellites 100A, 100B monitored and controlled by a Ground Segment GS that will also provide the capability to detect satellite or system malfunctions and broadcast real-time warnings (so called integrity messages) to users.

The Galileo Global Component will provide a number of satellite-only navigation services:

Open Services (OS) providing navigation & timing;

Safety-of-Life Services (SoL) providing integrity messages, incorporated into the navigation data messages of Open Service signals;

Commercial Services (CS) providing dissemination of commercial ranging and data signals by Galileo satellites;

Public Regulated Services (PRS) providing navigation & timing by means of independent, restricted-access navigation signals.

Other components of the Galileo System will provide Local Services to improve performances (e.g., integrity) on a local basis.

The Galileo system will also provide support to Search-and-Rescue (SAR) services.

In addition, Galileo will support External Regional Integrity Services (ERIS) by disseminating, over selected Galileo satellites, integrity data generated by independent, external regional integrity service providers.

The Galileo Space Segment will comprise a constellation of 27 operational satellites 100A, 100B (only two satellites being shown in FIG. 1, for simplicity) plus three in-orbit (inactive) spare satellites in medium-Earth orbit (MEO). Each operational satellite will broadcast a set of navigation signals (Nav) carrying clock synchronization, ephemeris, integrity and other data, depending on the particular signal. As noted previously, the space segment SS includes a first group of satellites 100A having rubidium clocks 101(R) and a second group having PHM clocks 101 (PHM).

A user 200 equipped with a suitable receiver 201 with good visibility of the sky will be able to receive around 11 Galileo satellites to determine his position to within a few meters, using a position determination unit 202.

The Galileo Ground Segment GS will control the complete Galileo constellation (27 satellites), monitor satellite health, and upload data for subsequent broadcast to users 200 via the mission uplink stations 300 (ULS). The key elements of these data such as clock synchronization, ephemeris and integrity messages will be calculated from measurements made by a worldwide network of Galileo Sensor Stations (GSS) 400. Only two such GSS are shown in FIG. 1, for simplicity.

Satellite navigation systems strongly depend on the predictability of the used onboard satellite clocks 101(R), 101 (PHM) and their performance, since such predictability directly drives the related service performance, e.g., in terms of positioning accuracy and thus service availability. If such performance is degraded by unpredictable events, such as onboard satellite clock frequency jumps, the finally achievable service performance at user level is degraded.

From various navigation satellite experimentation results (e.g., GIOVE satellites, but also GPS experimentation) it is confirmed that clock frequency jumps will occur for rubidium clocks 101(R), which are part of the Galileo IOV as well as FOC satellite design (and GPS as well). Such confirmed effect, which has not been heretofore taken into account in the Galileo design, jeopardizes positioning accuracy, as well as integrity services, and thus the complete Galileo design.

This effect is most severe for the Galileo integrity services since only big jumps above the typical ground integrity detection thresholds could be detected: the typical smaller jumps cannot be detected, and would therefore significantly degrade the integrity services.

This degradation is caused by the signals-in-space accuracy (SISA) that is provided to the user as major integrity information and overbounds the real signal-in-space error. If additional errors as caused by the frequency jumps need to be considered, the SISA must be increased accordingly, to such high values that no feasible integrity service performances could be achieved.

The present invention proposes methods to recover from such effect at user algorithm level, and thereby to limit the impact of satellite clock frequency jumps on the Galileo services.

The following sections therefore describe the known satellite clock frequency jump characteristics from GIOVE as well as GPS rubidium clocks;

the possible impact in the range domain and required SISA information a-priori degradation;

how to update the user integrity algorithm if the signal clock source type is known at user level; and how to update the user integrity algorithm if the signal clock source type is not known to the user.

GIOVE and GPS Satellite Clock Frequency Jumps

Galileo Phase CDE1 and IOV experimentation results, and IOV and FOC clock analysis already confirmed that clock frequency jumps will occur for rubidium clocks. Such behavior has been measured and observed from GIOVE Rubidium clocks, as well as GPS satellites that currently operate with Rb signals. It has also been observed, however, that PHM (maser type satellite clock) clock performances do not jump significantly at all.

It can be seen that such Rubidium clock jump characteristic needs to be considered as normal behavior, rather than a rare feared event. Such effect is also commonly known for longer tests navigation satellites, like the GPS satellites.

The signals of the PHM (master) performance do not show any jumps, and should therefore be preferred at user level.

Possible Range Impact and Integrity Information Degradation

Since the user cannot model a-priori such behavior (that is, clock frequency jumps) with the already provided clock parameters, an additional error will occur in the range domain to the affected satellite, depending on the jump magnitude as well as the time between jump occurrence and receipt of a new navigation data for that satellite (currently specified to not more than 100 minutes).

Figure 2:
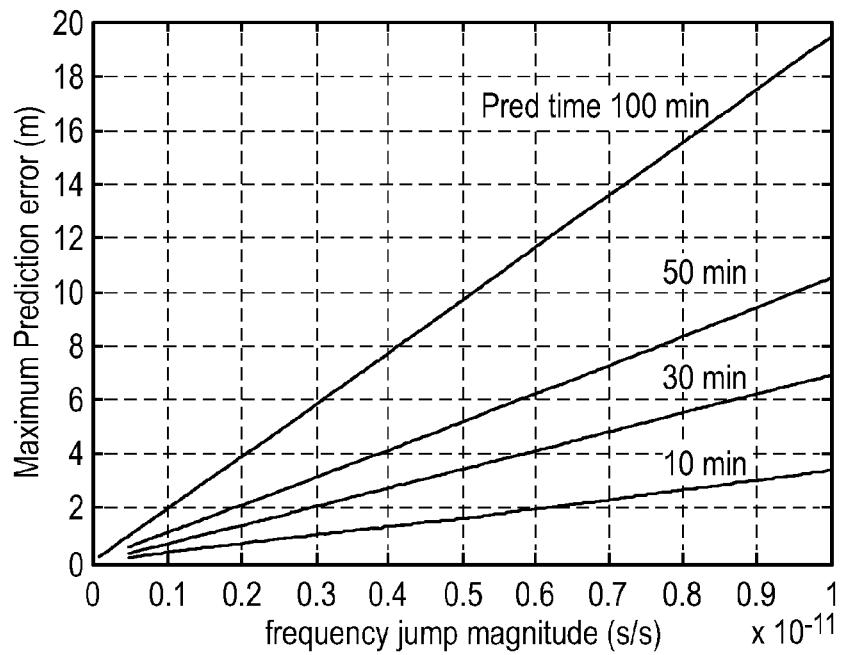
FIG. 2 shows a range impact of satellite clock frequency jumps.

FIG. 2 shows the maximum prediction error in the range domain depending on the jump magnitude, and navigation message update rate and age of the message, respectively. Typical jumps in the order of around 1e-12 s/s ($=e^{-12}$) would therefore degrade the ranging accuracy for the affected satellite by around 2 meters in case of 100 minutes baseline navigation message update rate. For smaller update rates the imposed range error decreases significantly. Thus, the age of the navigation message should also be considered at user level.

If, for a particular user, only one to two visible satellites are affected by a clock jump and related range error increase, the positioning accuracy for that user is slightly degraded, but globally for all users the impact on the related Galileo Open Service performance is rather limited.

For the transmitted major SISA integrity information the validity of such information needs to be ensured with high confidence to any user for each satellite, and if the user is considering such information and the related signal, the information would need to be increased to properly consider the additional range error.

The following equation can be used to inflate the SISA in case of biases b and standard deviation a of the underlying Gaussian distribution. Other and less conservative concepts are also possible.

$$SISA_i = \sigma \cdot e^{\frac{b^2}{2\sigma^2}}$$

To conservatively upper bound the inflation of SISA to ensure overbounding of the signal-in-space accuracy, the received SISA for the relevant satellite can be used as standard deviation σ, and the applicable onboard clock frequency jump barrier threshold as bias b (either received for the specific satellite via the navigation message, or hard defined also within the receiver).

Figure 3:
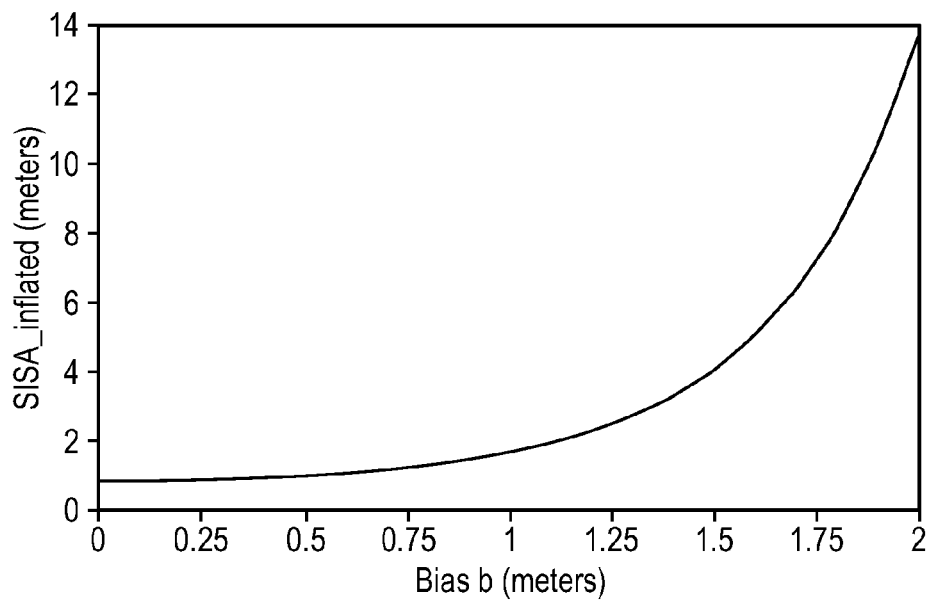
FIG. 3 shows a possible integrity information degradation.

FIG. 3 illustrates SISA inflation for 85 cm standard deviation (received SISA) for different biases up to typical 2 meters.

In case of typical 1.0 m bias or onboard jump barrier threshold, which represents a typical frequency jump of 5e-13 s/s ($=5 \cdot e^{-13}$) for 100 minutes navigation data validity time, the inflated SISA would correspond to a value of around 1.7 meters, two times higher than the 85 cm SISA upper bound specification that is required to globally achieve integrity service performance.

The maximum prediction errors would need to be smaller than around 50 cm to 100 cm to avoid excessive degradation of the SISA performance, which might jeopardize the Galileo integrity services performance.

However, since only RAFS (rubidium atomic frequency standard) signals are affected, the final impact on the integrity service performance is limited, especially if PHM is considered as master clock.

User Algorithm Modification with Known Satellite Clock Type

The following process endeavors to avoid, to a maximum extent, the usage of Rubidium signals, and focuses on the much better PHM signal performances that are not affected by significant jumps. Such clock type information could for example be provided to the user via SIS-ICD, where enough spare bits are available to transmit the information.

The signal selection could also be done with SISA threshold, depending on the final Galileo PHM performance compared to RAFS. With typically around 20 cm (>25%) improved performance for PHM frequency standard, the additional SIS-ICD information might not be necessarily required and the user just picks from available signals with SISA below such threshold (e.g., 65 cm). Furthermore the Rubidium-clock frequency jumps will also further increase the underlying historical SISA value for the RAFS statistics, which further increases the difference between PHM and RAFS SISA and reduces the test and threshold ambiguity.

Figure 4:
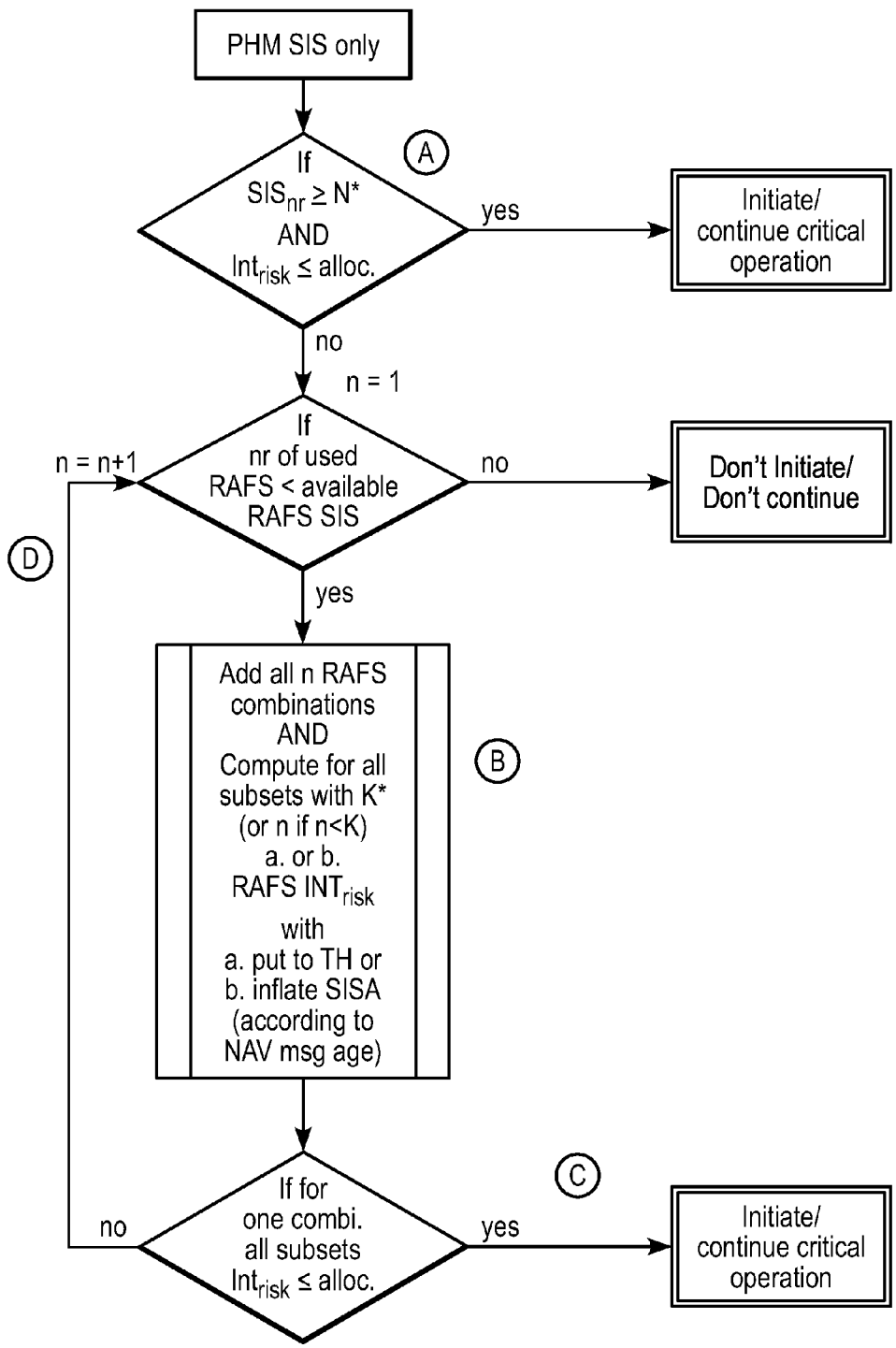
FIG. 4 shows a high level user algorithm modification flow chart with known satellite clock type (e.g., via SIS-ICD)

The flow chart in FIG. 4 illustrates the general algorithm function with known signal frequency standard source:

It first tries to initiate/continue the critical operation based on PHM signals only, either selected via SIS-ICD information of PHM vs. RAFS barriers/thresholds. Only if the integrity service is not available with PHM signals only, RAFS messages will be added and put to the ground segment detection threshold or with inflated integrity information (SISA) according to navigation message age.

If more than one RAFS signal is added, then only a certain number of RAFS signals (called a "sub-set") need to be degraded (i.e., put to threshold or with inflated SISA), since the probability to have more than one (or two, three, . . . ) RAFS signal simultaneously affected by a jump is negligible, or is already covered in the system integrity allocations. The different options regarding which RAFS signals are considered (i.e., added) are called "combinations".

If for one combination (i.e., set of additional RAFS signal(s)), all subsets (i.e., possible threshold or inflation combinations) allow for start or continuation of the critical operation, then the service is declared available.

Only if the service is not yet available with the first added RAFS signal(s), is it tried to improve the situation with further RAFS signals.

User Algorithm Modification without Known Satellite Clock Type

Figure 5:
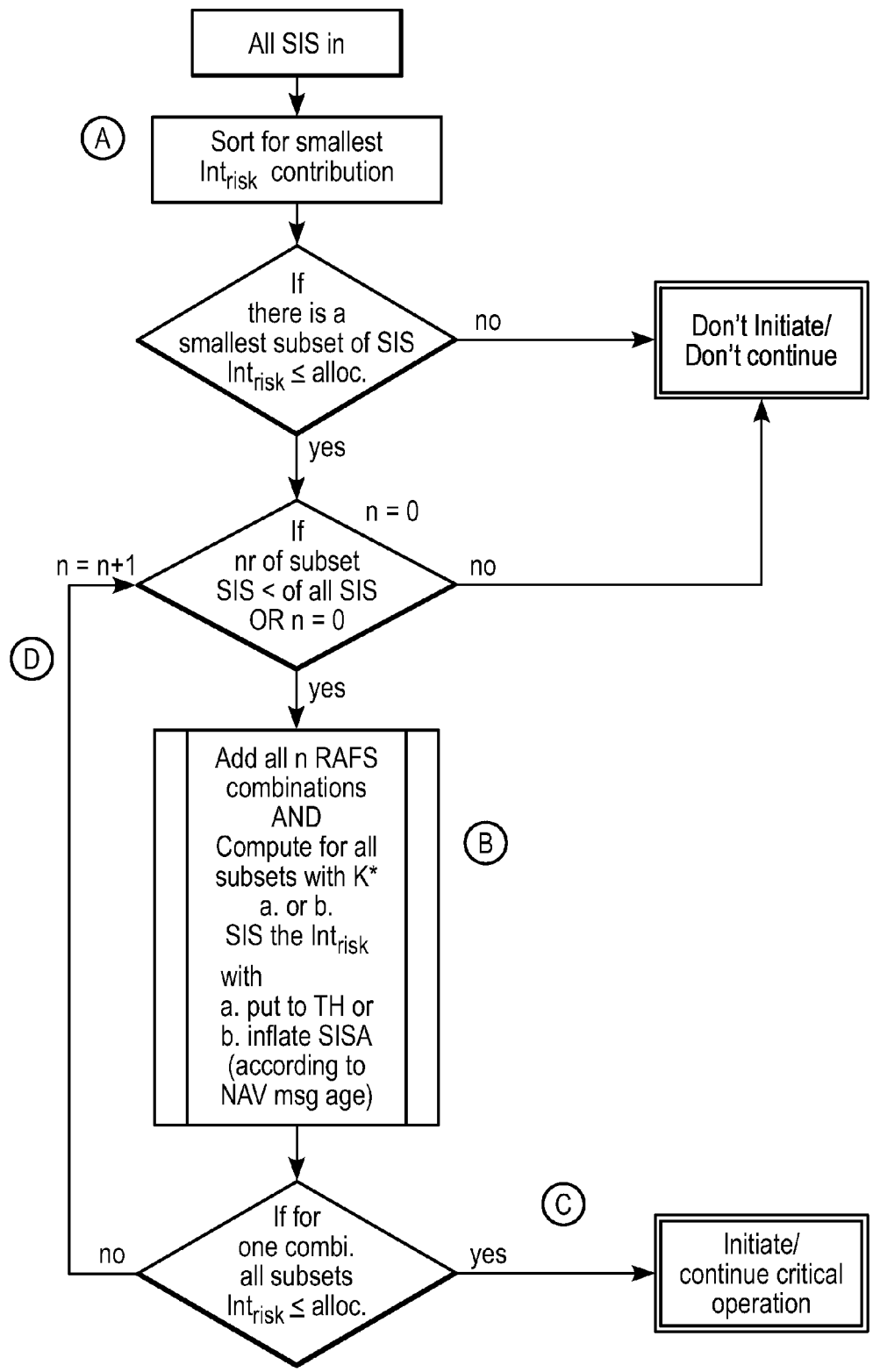
FIG. 5 shows a high level user algorithm modification flow chart without known satellite clock type.

If no such PHM information is available, neither via SIS-ICD, nor received SISA characteristics (e.g., because there is no clearly visible performance difference between PHM and RAFS), the subsequently described similar process, shown in FIG. 5, can be applied. For this approach the process attempts to start with a certain set of optimum signals (A), that need to be put to the threshold, or inflated, according to the already described process (B), and starts to add signals with higher risk contributions if the service is not yet available (D). If for one combination all subsets allow starting or continuing a critical operation (C), no additional signals are required.

Also different approaches (which follow in principle the same flows) are possible, such as, in case of "All SIS in", to start not with the smallest subset number, but with all SIS and to remove SIS with highest risk contribution, once the first loop was not successful. The object, however, is always the same, i.e.: to find a set of measurements the performance of which is resistant to a number of simultaneous failures or frequency jumps.

For both approaches it is ensured that only a set of measurements is considered for the critical operation, which is resistant from integrity point of view against K simultaneous faulty (e.g., jumping) SIS. Thus, this approach is not limited to satellite frequency jumps, but can also be applied in case of other similar events or general degraded or less performing signals.

The invention provides a method which minimizes the effect of satellite clock frequency jumps and other similar causes on Galileo's integrity services, by modifying only the user algorithm. Additional information could further be provided via updated messages (i.e., SIS-ICD update) to improve the concepts, but is not necessarily required.

With the invention, better performing signals as seen by the specific user are primarily considered, and less performing measurements are added only if such starting constellation is not sufficient. The signals are considered in a manner which preserves signal integrity by i) putting them to the ground detection threshold, or ii) by properly inflating the integrity information according to the navigation age.

Therefore the invention ensures a valid, but now also feasible Galileo integrity service from availability point of view, without significant changes at Space or Ground Segment level. Only minor changes at System and TUS level are required.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for reducing the effect of clock frequency jumps on a position determination device in a global navigation system in which a plurality of space vehicles, each having at least one clock, transmit information to the position determination device; said method comprising:
    a) said position determination device receiving navigation signals from space vehicles of a first group of space vehicles that have clocks in which frequency jumps do not occur;
    b) checking
        b1) whether navigation signals received from a number of space vehicles of said first group of space vehicles that are available sufficient to calculate a global navigation solution; and
        b2) whether an integrity risk calculated with the navigation signals received from the space vehicles of said first group of space vehicles is less than or equal to a predetermined acceptable maximum integrity risk;
    c) continuing with calculating a navigation solution, or with a critical operation if the conditions of steps b1) and b2) are fulfilled; or otherwise, continuing with step d);
    d) said position determination device receiving navigation signals from space vehicles of a second group of space vehicles having clocks in which frequency jumps can occur;
    e) adding, with integrity and in a safe manner, said navigation signals received from a space vehicle of said second group to said navigation signals received from the space vehicles of said first group;
    f) checking whether an integrity risk calculated for all combinations of the navigation signals received from the space vehicles of said first group, together with a sub-set of space vehicles of said second group which have integrity, is less than or equal to a predetermined acceptable maximum integrity risk;
    g) continuing with calculating the navigation solution or the critical operation if the condition of step f) is fulfilled; or otherwise, adding navigation signals received from another space vehicle of said second group to the navigation signals used in step f), with integrity and in a safe manner and repeating with step f).

2. The method of claim 1, wherein the navigation signals received from a space vehicle of said second group of space vehicles are added to the navigation signals, with integrity and in a safe manner in step e), by putting them to the ground segment detection threshold.

3. The method of claim 1, wherein the navigation signals received from a space vehicle of said second group of space vehicles are added to the navigation signals, with integrity and in a safe manner, in step e) by inflating integrity information of signal in space accuracy (SISA) to ensure that inflated SISA information overbounds, with integrity, real signal in space error of said signal.

4. The method of claim 3, wherein the SISA is inflated as a function of navigation data age in order to reduce necessary integrity information inflation of said signal.

5. The method of claim 1, wherein the space vehicles of said first group of space vehicles have clocks working according to the principle of passive hydrogen maser (PHM).

6. A method for reducing the effect of clock frequency jumps on a position determination device in a global navigation system, in which a plurality of space vehicles, each having at least one clock, transmit information to the position determination device; said method comprising:
    a) said position determining device receiving navigation signals from all available space vehicles;
    b) said position determining device determining an integrity risk of the navigation signals received from the space vehicles in step a);
    c) sorting the received navigation signals for a smallest individual integrity risk in a sorting list;
    d) determining a first combination of navigation signals from a combination of a predetermined number of space vehicles with smallest individual integrity risks;
    e) checking whether overall integrity risk calculated with the navigation signals received from the space vehicles of said first combination of space vehicles is less than or equal to a predetermined acceptable maximum risk;
    f) considering, for a sufficient number of available signals, or for a first iteration cycle, the navigation signals from the combination of space vehicles in a manner that provides signal integrity, and calculating a navigation solution or a critical operation if the condition of step e) is satisfied for all possible safe combinations; or otherwise adding to the subset used in step e), with integrity and in a safe manner, navigation signals received from a next space vehicle of the sorting list; and repeating step f).

7. The method of claim 6, wherein the navigation signals received from each of the space vehicles of the combination are added to the navigation signals, with integrity and in a safe manner, by putting them to a ground segment detection threshold in step e).

8. The method of claim 6, wherein the navigation signals received from each of the space vehicles of the combination of space vehicles are added to the navigation signals, with integrity and in a safe manner, by inflating integrity information of the signal in space accuracy (SISA) in step e) to ensure that the inflated SISA information overbounds, with integrity, an actual signal in space error of said signal.

9. The method of claim 6, wherein the SISA is inflated as a function of navigation data age in order to reduce required integrity information inflation of said signal.

* * * * *